May 6, 1969  K. BISCHOFF ET AL  3,442,294
CLOSURE MEANS FOR USE DURING PRESSURE TESTING
OF PIPES OR THE LIKE
Filed Jan. 3, 1966  Sheet 1 of 2

Inventors
Karl Bischoff
Heinrich Kirsch
by Michael J. Striker
Atty

May 6, 1969 K. BISCHOFF ET AL 3,442,294
CLOSURE MEANS FOR USE DURING PRESSURE TESTING
OF PIPES OR THE LIKE
Filed Jan. 3, 1966 Sheet 2 of 2
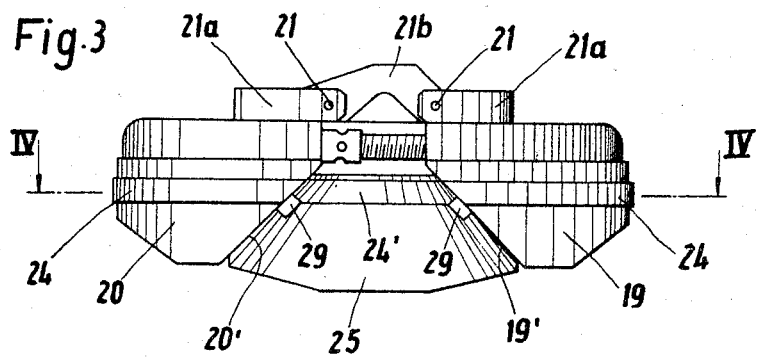
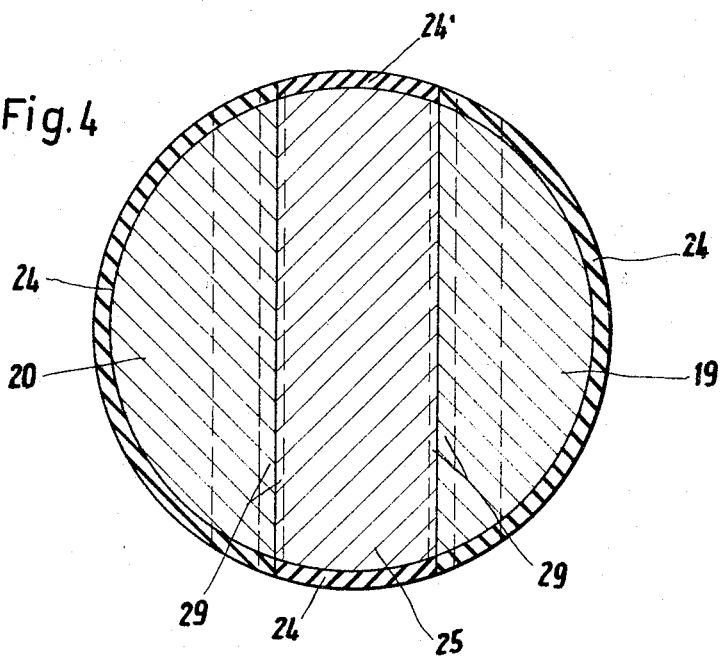
Inventors
Karl Bischoff
Heinrich Kitsch
by Michael J. Striker United States Patent Office 3,442,294
Patented May 6, 1969

3,442,294
CLOSURE MEANS FOR USE DURING PRESSURE
TESTING OF PIPES OR THE LIKE
Karl Bischoff, Mannheim, and Heinrich Kirsch, Mannheim-Sandhofen, Germany, assignors to Bopp & Reuther G.m.b.H., Mannheim-Waldhop, Germany
Filed Jan. 3, 1966, Ser. No. 518,488
Int. Cl. F16l 55/10
U.S. Cl. 138—90                                   13 Claims

ABSTRACT OF THE DISCLOSURE

Closure means for use during pressure testing of pipes and including sealing plate means extending transversely through a pipe and being composed of a pair of spaced outer parts having outer peripheral surfaces located on a common cylindrical surface and inner plane faces defining an axially extending wedge-shaped space, and an inner wedge-shaped part in the aforementioned space and having opposite peripheral surfaces located on said common cylindrical surface and inclined faces engaging the inner faces of the outer parts, and axially adjustable pressure means engaging the inner part for pressing the faces of the latter against the corresponding faces of the outer parts for pressing thereby an annular portion of the sealing plate means against an annular seat formed in the pipe and the peripheral surfaces of the outer parts against the inner pipe surface. The pipe is formed in the wall thereof with an opening having a smaller cross-section than the inner cross-section of the pipe and the parts of the sealing plate means are dimensioned to be insertable and removable through this opening.

---

Steam boilers and pipes are tested by feeding cold water at high pressure thereinto, whereby the part to be tested has to be closed off with regard to other parts connected thereto. Usually, slide valves are used for this purpose which often are closed only during the pressure testing while remaining open during normal operation of the steam boiler or the pipes. To properly carry out the pressure tests it is essential that these slide valves are absolutely fluid-tight. However, when the slide valves have not been used for considerable time, it is practically always necessary to refinish the plate and seat surfaces of the valve in order to assure proper fluid-tightness. This finishing is time-consuming and delays carrying out the pressure test. In addition slide valves of this type occupy a relatively large space and they are rather expensive since they have to be made from forged steel. The large surface of the valve housing causes also a considerable heat loss in the pipe to which the valve is connected and the enlargement of the diameter of the valve housing between the seat surfaces of the valve plate causes also a pressure loss in the medium flowing through the pipe.

It is an object of the present invention to provide for a closure means for use during pressure tests of pipes or the like which avoid the above disadvantages of slide or similar valves used for this purpose.

It is an additional object of the present invention to provide for closure means for the above mentioned purpose which can be easily inserted into a pipe section for fluid-tightly closing the same during pressure tests and which can be easily removed after the pressure tests have been carried out.

It is a further object of the present invention to provide closure means of the aforementioned type which are composed of relatively few and simple parts so that they can be manufactured at reasonable cost and will stand up perfectly under use.

With these objects in view, the closure means according to the present invention for use during pressure testing of pipes or the like mainly comprise a pipe section adapted to be permanently connected at opposite ends thereof into the pipe to be tested and formed in the interior thereof with an annular seat and abutment means axially spaced from the annular seat and having a face facing the seat, sealing plate means extending transversely through the pipe section and abutting with an annular portion thereof against the seat, and axially adjustable pressure means engaging with one end thereof the sealing plate means and being connected at the other end thereof to the face of the abutment means for pressing the annular portion of the sealing plate means against the seat.

Preferably the pipe section is formed with an opening in the wall thereof for introducing and removing the sealing plate means and the pressure means into and out from the pipe section, and cover means are provided for closing the opening. The cover means may be formed with passage means therethrough for feeding pressure fluid through the cover means to one side of the sealing plate means.

The closure means according to the present invention has, as compared with slide valves used for this purpose, the advantage that the space requirements of the closure means are considerably smaller than that of slide valves. Furthermore, exactly machined sealing surfaces, as are necessary in slide valves, are not required in the closure means according to the present invention, nor a handwheel or a spindle with the necessary stuffing box which complicates the sealing problem in slide valves. Since the pressure tests are carried out with cold water and the closure means are removed from the pipe during normal operation of the steam boiler and pipes connected thereto, it is possible to use a rubber sealing ring on the sealing plate means so that it is not necessary to exactly machine the seat against which the sealing ring of the sealing plate means will abut. Refinishing operations will not be necessary with the closure means according to the present invention since the same is placed into the pipe only during testing thereof and removed from the pipe during the normal operation so that the pressure plate means will not be subjected to corrosion during operation of the steam boiler. Heat losses which are unavoidable with permanently built-in slide valves, may also be avoided with the closure means of the present invention, since the opening in the pipe section through which the closure means are introduced and removed can be held relatively small so that it can be perfectly insulated against heat loss. Due to the compact construction of the closure means, the pipe section in which the closure means is used will not be weakened to any considerable extent and pressure losses in this pipe section will also be negligible.

The closure means may also include support plate means extending spaced from the sealing plate means through the pipe section and abutting against the aforementioned face of the abutment means, and in this arrangement the axially adjustable pressure means engages with opposite ends thereof the support plate means and the sealing plate means.

According to a further feature of the present invention the sealing plate means as well as the support plate means may each be made from a plurality of parts and such an arrangement is preferably used with pipes having a relatively large inner diameter, whereby the opening in the pipe section through which the sealing plate means and the support plate means are introduced into the pipe section can be held relatively small, that is, smaller than the inner diameter of the pipe section. The pipe section will thereby be less weakened by the relatively small opening through the wall thereof so that the wall thickness of the pipe section has not to be unnecessarily increased. An additional advantage of the arrangement is that any substantial accumulation of material in or about the opening through the wall of the pipe section will be avoided so that the steam boiler may be placed quicker in operation since stresses caused by material accumulation will be negligible and can be disregarded.

The closure means according to the present invention may also be used for connecting blowout conduits thereto so that the pipe may be cleaned before it is taken in operation and through which pickling fluid for cleaning the boiler may also be discharged.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a top view of the sealing plate means shown in FIG. 2; and

FIG. 4 is a cross section taken along the line IV—IV of FIG. 3.

Figure 1:
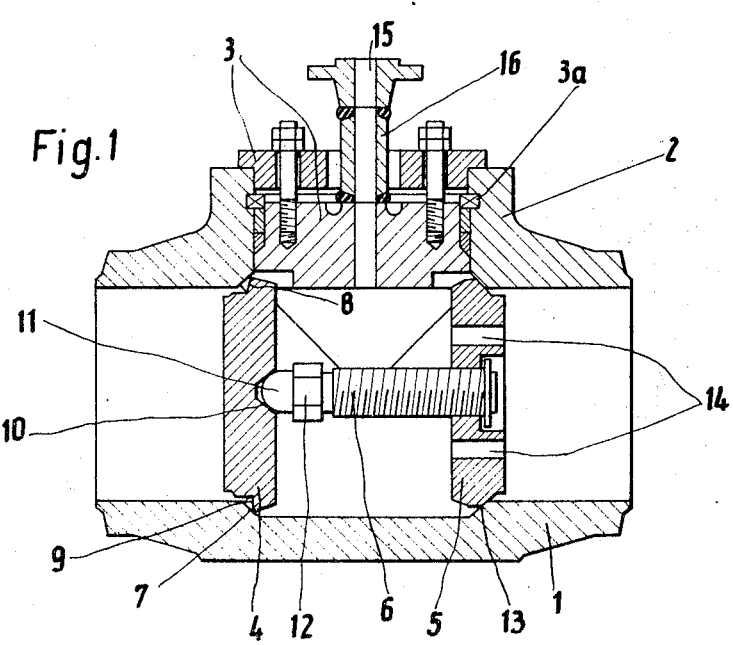
FIG. 1 is a longitudinal cross section through one embodiment of the closure means according to the present invention.

Referring now to the drawings, and more specically to FIG. 1 of the same, it will be seen that the closure means illustrated in this figure comprises a pipe section 1 adapted to be permanently connected at opposite ends thereof into the pipe to be tested. The pipe section is provided with an integral tube portion or nipple 2, projecting for instance upwardly from the pipe section 1, the opening of which is closed by cover means 3 of known construction. As shown in FIG. 1 a snap ring 3a is placed in an annular-groove of the nipple 2 and the cover means comprises an upper plate having a rim portion abutting against the top surface of the nipple and a lower plate on the peripheral surface of which a pair of sealing rings are arranged so that when the screws, extending through openings in the upper plate and screwed in correspondingly threaded bores in the lower plate, are tightened by means of the nuts thereon, the sealing rings at the lower plate will be pressed tightly against the snap ring 3a so that the opening in the nipple will be properly closed. The opening through the nipple serves, when the cover 3 is removed, for introducing the actual closure means into the pipe section 1. The closure means illustrated in FIG. 1 basically comprises three parts, that is a sealing plate 4, a support plate 5 and axially adjustable pressure means which may be in form of a screw bolt 6. The pipe section 1 has a central portion of larger inner diameter than opposite end portions thereof so as to form an annular seat 7 and axially spaced therefrom an annular abutment means 13 having a face facing the seat 7.

The sealing plate 4 has an annular shoulder face 8 to which a sealing ring 9, of preferably substantially semicircular cross section, which may for instance be formed from rubber, is fastened, for instance by cementing, and the sealing ring 9 abuts with its curved face against the annular seat 7. A substantially frustoconical central cavity is provided at the side of the sealing plate 4 facing the support plate 5 and a semi-spherical end 11 of the bolt 6 is located universally tiltable with regard to the sealing plate 4 in the cavity 10 whereas the other end of the bolt 6 is screwed into a correspondingly threaded central bore in the support plate 5. A hexagonal portion 12 provided on the screw bolt 6 intermediate the ends thereof serves to turn the latter about its axis by means of a wrench extended through the opening in the nipple 2, when the cover 3 is removed therefrom, so that the position of the screw bolt relative to the support plate 5 may be adjusted and the sealing plate 4 with its sealing ring 9 be pressed tightly against the seat 7 while the support plate 5 abuts with an annular shoulder thereof against the abutment face 13. The support plate 5 is preferably formed with a plurality of openings 14 therethrough so that water under pressure may be fed through a conduit 15, extending through an opening in the outer plate of the cover 3 and connected to the inner plate thereof, through a central bore in the inner plate, into the space between the sealing plate 4 and the support plate 5, and through the openings 14 in the latter to the right side, as viewed in FIG. 1, of the support plate 5. The part to be tested is in this arrangement connected to the right end, as viewed in FIG. 1, of the pipe section 1. Cold water under pressure is fed to the conduit 15 by a pressure pump, not shown in the drawing.

Figure 2:
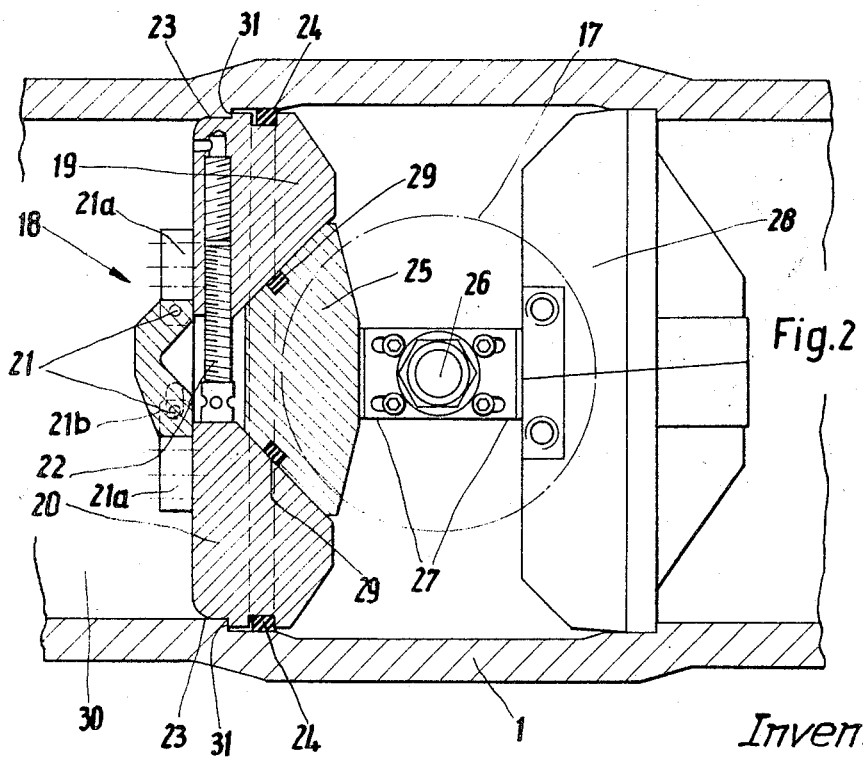
FIG. 2 is a top view partially cross sectioned of another embodiment of the closure means of the present invention.

FIGS. 2–4 illustrate a further embodiment of the closure means according to the present invention. While in the embodiment shown in FIG. 1 the sealing plate 4 and the pressure plate 5 consist each of a single plate member, the corresponding sealing plate means 18 of the embodiment illustrated in the FIGS. 2–4 essentially consists of three parts, whereas the support plate means 28 essentially consists of two parts.

The arrangement illustrated in FIGS. 2–4 is especially suitable for use with pipes of relatively large inner diameter in which the pipe section 1, which is to be connected at opposite ends thereof into the pipe to be tested, is provided with an integral nipple as described before in connection with FIG. 1, in which however the nipple may be provided with an inner diameter considerably smaller than the inner diameter of the pipe section 1, as indicated by the dash-dotted lines 17 in FIG. 2. The sealing plate means 18 as well as the support plate means 28 are constructed in such a manner so as to be introducible into and removable from the pipe section 1 through the relatively small opening 17 in the nipple thereof. The sealing plate means 18 comprises two parts 19 and 20 having outer peripheral surfaces 23 forming part of a cylindrical surface. The parts 19 and 20 are connected spaced from each other and tiltable with respect to each other by a hinge comprising members 21a respectively fixed to the parts 19 and 20 on the left side thereof, as viewed in FIG. 2, and hingedly connected to each other by a bow-shaped part 21b which is hinged at opposite ends to the parts 21a by hinge pins 21. The bow-shaped part 21b is provided with an elongated slot at one end thereof through which one of the hinge pins 21 extends so that the parts 19 and 20 may not only be tilted with respect to each other but also shifted slightly toward and away from each other. The hinge pins 21 are secured in the usual manner by cotter pins or snap rings against movement in axial direction. Circumferentially extending grooves of rectangular cross section are formed in the peripheral surfaces of the parts 19 and 20 in which sealing strips 24, for instance from rubber, and of rectangular cross section are located. A screw bolt 22 screwed into a correspondingly threaded transverse bore in the part 19 may be turned, after the parts 19 and 20 are introduced in collapsed position through the opening 17 into the pipe section 1, to abut with the head thereof against one face of the part 20, as best shown in FIG. 2, so as to keep the parts 19 and 20 in spread position whereby the sealing strips 24 respectively provided in the grooves of the parts 19 and 20 may be pressed against the inner surface of the pipe section 1 to keep the two parts 19 and 20 in spread position held on to the inner surface of the pipe section 1, even if the latter extends in vertical direction. The parts 19 and 20 of the sealing plate means 18 have, on the side thereof facing the pressure plate means 28, respectively faces 19' and 20' inclined with respect to each other and symmetrically arranged with respect of a vertical plane of symmetry of the pressure plate means 18 so as to form a wedge-shaped space. A wedge 25 extends longitudinally through the space abutting with faces thereof against the faces 19' and 20', respectively. The opposite peripheral end faces of the wedge 25 which respectively face inner surface portions of the pipe section 1 are cylindrical and on a common cylindrical surface with the peripheral surfaces of the parts 19 and 20. The peripheral grooves in the parts 19 and 20 are continued through the peripheral surfaces of the wedge 25 and sealing strip sections 24' forming continuation of the sealing strips 24 in the grooves of the parts 19 and 20 are arranged in the grooves formed in the peripheral surfaces of the wedge 25. Longitudinal grooves are provided in the faces of the wedge 25 which respectively abut against the faces 19' and 20' and sealing strips 29 of substantially rectangular cross section extend longitudinally through these grooves filling the same up to the peripheral surfaces of the wedge 25. The sealing strips 29 are arranged, as best shown in FIG. 3, to intersect the sections 24' of the peripheral sealing strips.

The wedge 25 is pressed by axially adjustable pressure means engaging with opposite ends thereof the rear face of the wedge 25 and the face of the support plate means 28 facing the rear face of the wedge 25, and this axially adjustable pressure means may be constructed similar to the axially adjustable pressure means shown in FIG. 1, or an arrangement of known construction, schematically shown in FIG. 2, may be used in which a draw key operated by a spindle 26 engages a pair of oppositely arranged wedge parts 28, slidably connected by screws to a part which turnably carries the spindle 26, so that the parts 27, during turning of the spindle 26 and upward movement of the draw key connected thereto, are moved away from each other to thereby press the wedge 25 against the faces 19' and 20'. Thereby the two parts 19 and 20 of the sealing plate means 18 are pressed in radial outward direction and the sealing strip sections 24 are thereby tightly pressed against the inner surface of the pipe section 1. The support plate means 28 is likewise formed of two parts as clearly shown in FIG. 2. During expansion of the axially adjustable pressure means 26, 27 the parts 19 and 20 are also pressed with a peripheral shoulder face thereof against the seat 31 formed in the pipe section 1, however the seat in this case has to have only a dimension necessary to withstand the axial pressure imparted to the sealing plate means 18 since the actual seal will be provided by the radially outwardly pressed sealing strip sections 24. The pipe section 1 is also provided with an abutment face corresponding to the abutment face 13 shown in FIG. 1 against which an annular shoulder portion of the support plate means 28 abuts.

The wedge 25 may be provided with appropriate bores fluid-tightly connected to a conduit extending through the opening 17 and connected at the outer end to a pressure pump so that liquid under pressure may be fed to the left side, as viewed in FIG. 2, of the pressure plate means 18. On the other hand, if the pipe connected to the right end, as viewed in FIG. 2, of the pipe section 1 has to be tested, the support plate means 28 may be formed with appropriate bores therethrough so that pressure fluid may be fed into the space between the sealing plate means 18 and the pressure plate means 28 and through the bores thereof to the right side of the pressure plate means 28.

It will be understood that each of the elements described above, or two or more together, may also find a useful application in other types of closure means for use during pressure testing of pipes or the like differing from the types described above.

While the invention has been illustrated and described as embodied in a closure means for use during pressure testing of a pipe or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Closure means for use during pressure testing of pipes comprising, in combination, a pipe section adapted to be permanently connected at opposite ends thereof into a pipe to be tested, said pipe section being formed in the interior thereof with an annular seat and abutment means axially spaced from said seat and having a face facing said seat, said pipe section being further formed in the wall thereof with an opening having a cross-section smaller than the inner cross-section of said pipe section; sealing plate means extending transversely through said pipe section and abutting with an annular portion thereof against said seat, said sealing plate means comprising only two outer parts each of which has an outer peripheral surface located on a common cylindrical surface with the outer peripheral surface of the other outer part, and an inner face facing the inner face of the other part and including an angle therewith so that said inner faces of said outer parts define between themselves a wedge-shaped space tapering in axial direction toward said seat, and an inner wedge-shaped part in said space and having a pair of inclined faces engaging said inner faces of said outer parts and a pair of opposite peripheral surfaces extending between said inclined faces and being located on said common cylindrical surface, all parts of said sealing plate means having a maximum cross-section smaller than that of said opening so that said parts may be placed in said pipe section and be removed therefrom through said opening; and axially adjustable pressure means engaging with one end thereof said inner wedge-shaped part of said sealing plate means and being connected at the other end thereof to said face of said abutment means for pressing said annual portion of said sealing plate means against said seat and the peripheral surfaces of said outer parts against the inner surface of said pipe section.

2. Closure means as set forth in claim 1, and including sealing means of resiliently compressible material about said peripheral surfaces and additional sealing means between said faces of said parts.

3. Closure means as set forth in claim 2, wherein each of said inclined faces of said wedge-shaped part is formed with a longitudinal groove of substantially rectangular cross section and extending from one to the other of said opposite peripheral surfaces thereof, said additional sealing means being formed by sealing strips of rectangular cross section located in the longitudinal grooves of said wedge-shaped part.

4. Closure means as set forth in claim 1, and including auxiliary spreading means cooperating with said outer parts for moving the peripheral surfaces thereof in engagement with the inner surface of said pipe section before pressing the inclined faces of said wedge shaped inner part against said inner faces of said outer parts.

5. Closure means as set forth in claim 4, and including means connecting said outer parts to each other movable between a collapsed position in which said inner faces are closely adjacent each other and in a spread position in which said peripheral surfaces engage the inner surface of said pipe section, said outer parts in their collapsed position being insertable into said pipe section and removable therefrom through said opening.

6. Closure means as set forth in claim 5, wherein said connecting means are in the form of hinge means hingeably connected at opposite ends to said outer parts.

7. Closure means as set forth in claim 5, wherein said auxiliary spreading means comprise a screw threaded in a substantially radially extending bore of one of said outer parts and having a head engaging a face of the other outer part.

8. Closure means as set forth in claim 4, and including radially outwardly acting sealing means between said peripheral surfaces of said parts and the inner surface of said pipe section.

9. Closure means as set forth in claim 8, wherein each of said parts is formed at the peripheral surface thereof with a groove of substantially rectangular cross section, and wherein said sealing means are formed by sealing strips of rectangular cross section located in the respective groove, each abutting with opposite ends thereof against corresponding ends of the strips adjacent thereto.

10. Closure means as set forth in claim 1 and including cover means for closing said opening.

11. Closure means as set forth in claim 10, and including passage means formed through said cover means for feeding pressure fluid threrethrough.

12. Closure means as set forth in claim 10, and including support plate means extending spaced from said sealing plate means through said pipe section and abutting against said face of said abutment means, said other end of said axially adjustable pressure means engaging said support plate means.

13. Closure means as set forth in claim 12, said plate-shaped support means being likewise formed of a plurality of parts.

References Cited

UNITED STATES PATENTS

| | | | |
|---|---|---|---|
| 755,082 | 3/1904 | Vanderman | 138—90 |
| 1,462,113 | 7/1923 | Kuhner | 138—90 X |
| 1,573,410 | 2/1926 | McCabe et al. | 138—90 |
| 1,705,666 | 3/1929 | Gentry | 138—94 |
| 2,165,228 | 7/1939 | Cornell | 138—94 X |
| 3,155,116 | 11/1964 | Vernooy | 138—89 |

LAVERNE D. GEIGER, *Primary Examiner.*

EDWARD J. EARLS, *Assistant Examiner.*

U.S. Cl. X.R.

138—94